United States Patent
Goss et al.

(10) Patent No.: US 11,204,883 B1
(45) Date of Patent: Dec. 21, 2021

(54) DATA STORAGE SYSTEM WITH ACCESS COMPLETION UNIFORMITY

(71) Applicant: Seagate Technology LLC, Fremont, CA (US)

(72) Inventors: Ryan James Goss, Prior Lake, MN (US); Graham David Ferris, Savage, MN (US); Daniel John Benjamin, Savage, MN (US); Ryan Charles Weidemann, Victoria, MN (US)

( * ) Notice: Subject to any disclaimer, the term of this patent is extended or adjusted under 35 U.S.C. 154(b) by 0 days.

(21) Appl. No.: 16/946,427

(22) Filed: Jun. 22, 2020

(51) Int. Cl.
*G06F 13/16* (2006.01)
*G06F 12/02* (2006.01)

(52) U.S. Cl.
CPC ...... *G06F 13/1668* (2013.01); *G06F 12/0253* (2013.01); *G06F 2212/1044* (2013.01)

(58) Field of Classification Search
CPC .............. G06F 13/1668; G06F 12/0253; G06F 2212/1044
See application file for complete search history.

(56) References Cited

U.S. PATENT DOCUMENTS

| | | | | |
|---|---|---|---|---|
| 5,168,568 | A * | 12/1992 | Thayer | G06F 13/36 710/125 |
| 8,862,806 | B2 * | 10/2014 | Yoon | G06F 3/0653 711/103 |
| 9,015,403 | B2 * | 4/2015 | Jeong | G11C 16/349 711/103 |
| 10,025,522 | B2 | 7/2018 | Helmick | |
| 10,185,511 | B2 | 1/2019 | Sharma et al. | |
| 10,296,234 | B2 | 5/2019 | Chen et al. | |
| 2002/0024844 | A1 * | 2/2002 | Saeki | G11C 16/3436 365/185.22 |
| 2002/0071328 | A1 * | 6/2002 | Fujimoto | G11C 11/406 365/222 |
| 2003/0156652 | A1 * | 8/2003 | Wise | G06F 13/1673 375/240.26 |
| 2014/0173636 | A1 * | 6/2014 | Maciocco | G06F 1/3206 719/318 |
| 2016/0301617 | A1 * | 10/2016 | Peterson | H04L 47/52 |
| 2017/0168986 | A1 * | 6/2017 | Sajeepa | G06F 15/17331 |

* cited by examiner

*Primary Examiner* — Henry Tsai
*Assistant Examiner* — John B Roche
(74) *Attorney, Agent, or Firm* — Hall Estill Law Firm (57) ABSTRACT

A data storage system can transfer user-generated data from a data storage device to a host responsive to a host workload that consists of data read requests from the host received at a requested rate. A completion rate of a data read request can be delayed in accordance to a data access uniformity strategy to nominally match the requested rate.

20 Claims, 4 Drawing Sheets

DATA STORAGE SYSTEM WITH ACCESS COMPLETION UNIFORMITY

SUMMARY

In accordance with some embodiments, a data storage system transfers user-generated data from a data storage device to a host responsive to a host workload that consists of data read requests from the host received at a requested rate. A completion rate of a data read request can be delayed in accordance to a data access uniformity strategy to nominally match the requested rate.

A data storage system, in various embodiments, services a data read request to transfer user data from a non-volatile memory of a data storage device to a host by retrieving the user data from the non-volatile memory. The retrieved user data is transferred across an interface to an allocated buffer of the host prior to a delay being initiated. The delay has a magnitude selected in response to a difference between a target rate of the host and a request completion rate of the data storage device.

These and other features which may characterize various embodiments can be understood in view of the following detailed discussion and the accompanying drawings.

DETAILED DESCRIPTION

Generally, various embodiments disclosed herein are directed to provide data access completion uniformity despite variable data access completion capabilities in a distributed data storage system. By providing greater data access completion uniformity to a requesting host, a data storage system can sustain data access performance in a manner that allows the host to reliably guarantee data delivery to a customer connected to the host.

The proliferation of cloud-based data storage has provided vastly greater data storage capacity and accessibility than computing devices utilizing local memory for long-term data storage. The ability of cloud-based data storage systems can allow numerous different users to request data access that are satisfied concurrently and/or sequentially with varying completion rates. However, high variability for data access request completion in cloud-based distributed data storage systems can result in unreliable delivery of data, or data storage confirmation, to customers accessing the data storage system.

As a non-limiting example, video streaming services that store data in a cloud-based distributed data storage system deliver data to a customer and would rather be able to ensure consistent data access completion uniformity than data delivered at different faster or slower rates, which corresponds with increased buffering or other delays to the customer. Another example involves social media platforms that utilize cloud-based data storage systems to store large volumes of data for later consumption and would rather be able to know a maximum amount of time is needed to store data due to high data access completion uniformity than some fast data accesses and some slow data accesses that make predicting when data will securely be captured/stored. Hence, increased data access completion uniformity can provide optimized data storage operation, particularly for distributed data storage systems and clients that utilize cloud-based data storage.

Accordingly, embodiments of a distributed data storage system throttle at least one data access request completion in accordance with a access uniformity strategy generated by a data access module in response to detected and predicted data storage conditions to increase the consistency of data access request completions over time. The utilization of a proactively generated access uniformity strategy allows for efficient implementation of one or more corrective actions to decrease data access completion variability. Such access uniformity strategy can be particularly useful in distributed data storage systems where numerous data access requests are being received, and satisfied, concurrently to numerous different data storage devices that respectively have varying data storage capabilities, performance, capacity, and load.

Figure 1:
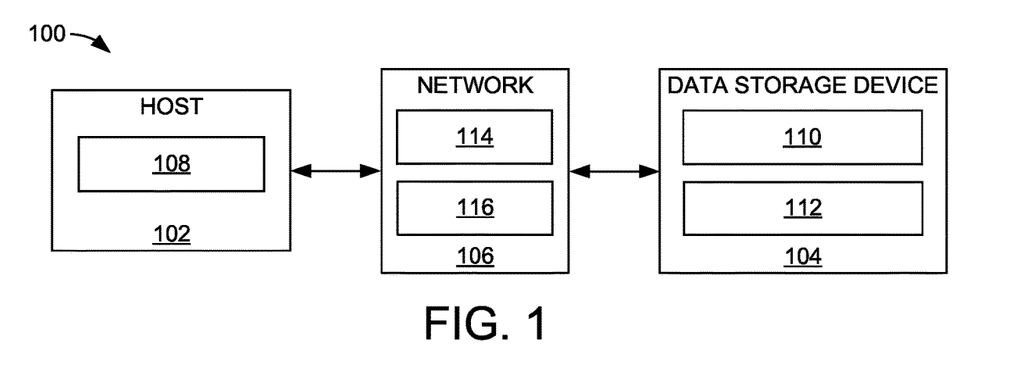
FIG. 1 provides a functional block representation of a data storage system in which assorted embodiments may be practiced.

FIG. 1 depicts a functional block representation of an example distributed data storage system 100 in which assorted embodiments can be practiced. In the simplified, and non-limiting, system 100 of FIG. 1, a host 102 is connected to a data storage device 104 via a network 106. It is contemplated that a plurality of hosts 102 can access one or more data storage devices 104 with at least one wired, or wireless, signal pathways that collectively can be characterized as a network 106.

A host 102 can be any computing device that employs a local controller 108, which can be a microprocessor or other programmable circuitry, to generate and process at least data access requests. In some embodiments, the remote host 102 can be connected to a downstream customer/client that is a destination, or origin, for data involved in a data access request to one or more data storage devices 104. A local controller 110 may also be present in a data storage device 104 to conduct assorted data storage, retrieval, maintenance, and security operations to a local memory 112. Such memory 112 may be any non-volatile data storage mechanism, such as solid-state cells or rotating magnetic media, that can be reliably accessed over time to satisfy a request from a host 102 and/or from a network administrator, such as a network controller 114. It is noted that the network 106 may consist of one or more memories 116 that can be volatile or non-volatile in nature and provide buffering, caching, and other temporary storage for data as it passes between hosts 102 and data storage devices 104.

Figure 2:
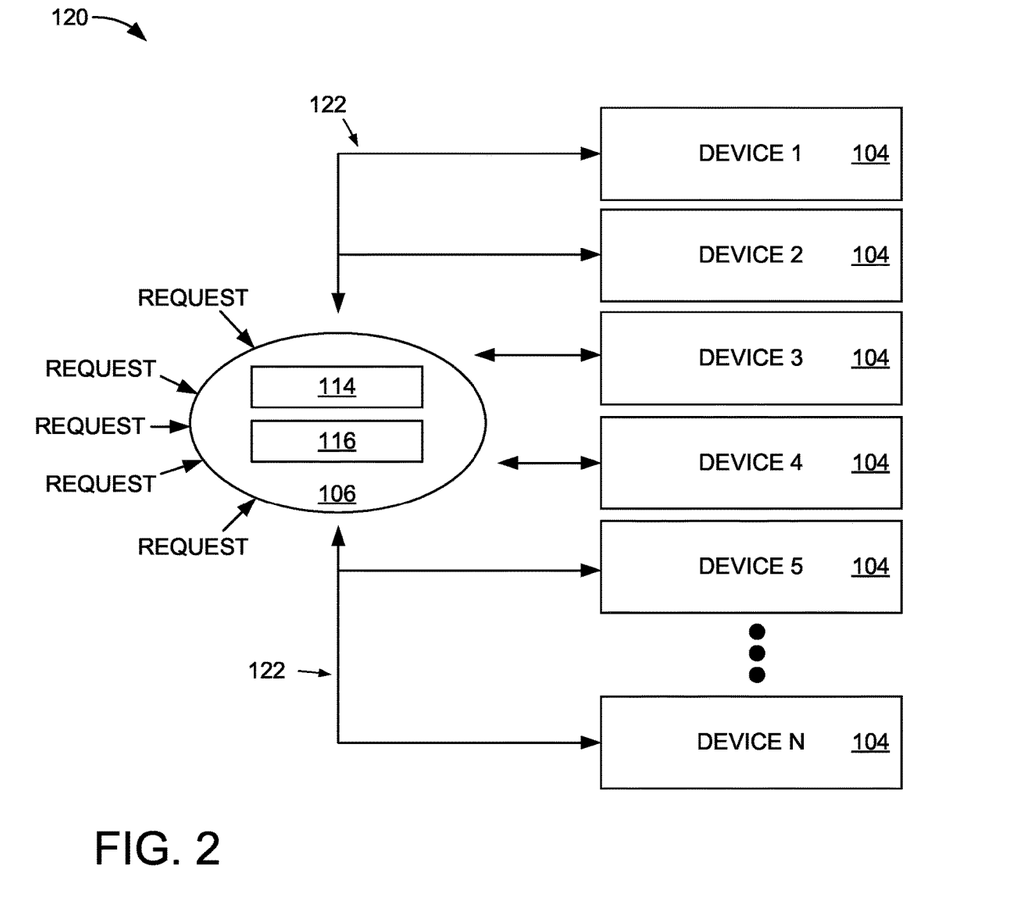
FIG. 2 shows block representations of aspects of an example data storage system employed in accordance with some embodiments.

FIG. 2 depicts a functional block representation of portions of an example data storage system 120 arranged in accordance with some embodiments. As shown, the data storage system 120 connects a number (N) of data storage devices 104 to a network controller 114 to facilitate data access completion through the storage of data to, or retrieval of data from, at least one memory 112 of at least one device 104 via a wired, or wireless, signal pathway 122.

Over time, the data storage performance of the respective data storage devices 104 can vary. For instance, solid-state non-volatile memories can conduct a variety of data maintenance operations to level-load the number of data accesses to a particular portion of memory 112 as well as to make portions of the memory 112 available for new data. These exemplary operations can generally be considered data maintenance activity, which can be narrowed to garbage collection, data mapping, and data movement conducted by the local controller 110. With different data storage devices 104 experiencing different volumes of data to be stored and updated over time, varying amounts of data maintenance operations will be conducted and pending for a particular data storage device 104 at any given time.

While the network controller 114 can attempt to choreograph where data access requests are sent and when data maintenance operations are carried out, it is contemplated that varying data storage and retrieval performance will be present over time when numerous data storage devices 104 are employed. That is, satisfaction of a data access requests to the system 120 are expected to have varying completion rates due, at least in part, to the differing data storage conditions of the respective data storage devices 104. It is noted that a data access completion rate can be quantified as the amount of time it takes for a generated request to be returned with a request completion signal from the network controller 114 or the local data storage device controller 110.

Figure 3:
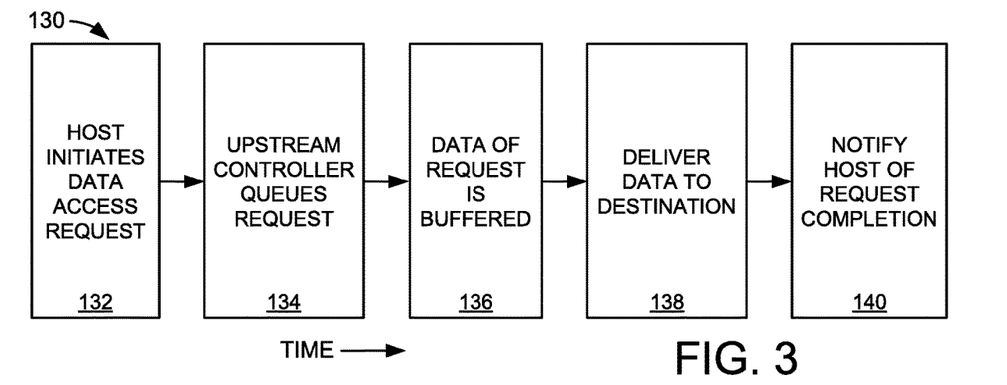
FIG. 3 depicts an example timeline for operation of an example data storage system in accordance with some embodiments.

FIG. 3 conveys a timeline 130 of operational activity that can be experienced by a data storage system in accordance with various embodiments. A distributed data storage system can be utilized by one or more connected hosts that initiate data access requests in step 132. Receipt of the data access request prompts the upstream network controller to queue the request in step 134 by scheduling the request completion to the data storage device(s) where the requested data is stored, or is to be stored. It is noted that the queuing of a data access request can involve numerous operations by the upstream network controller, such as table lookup, data mapping, and background device activity like garbage collection and data reconstruction.

Data associated with a data access request is then buffered in one or more temporary memories during step 136. It is contemplated that the movement of data to a buffer can coincide with the queuing of the data access request in step 134. That is, a data access request for a data write may concurrently move data from a host to a temporary memory, or from a data storage device to a temporary memory for a data read, while the network controller queues the request for completion from the buffer to a destination. At some time after the data access request is queued and data is buffered, the request is completed in step 138 by delivering data to the predetermined destination, either the data storage device in the case of a data write request or the host in the case of a data read request.

While delivery of data to a destination may coincide with completion of the data access request, it is contemplated that a separate completion notification is sent to the destination in step 140 to verify that the data access request has been completed. In other words, steps 138 and 140 may be consolidated to occur concurrently in some embodiments while other embodiments deliver data to a destination prior to notifying the destination that the originating data access request has been completed. Conventionally, the completion of a data access request is carried out as fast as a data storage system can accurately and securely provide.

However, the advent of deterministic data access windows with non-volatile memory express (NVMe) interface has emphasized the consistency of data access request completion over time, which contrasts completing a request as fast as possible with completion time variability between requests over time. Hence, various embodiments are directed to managing the completion of data access requests to increase completion consistency over time, which can be characterized as completion uniformity. The ability to intelligently manage the various aspects of data access request handling, execution, and completion allows a distributed data storage system to provide more, and longer, deterministic data access windows to hosts.

Figure 4:
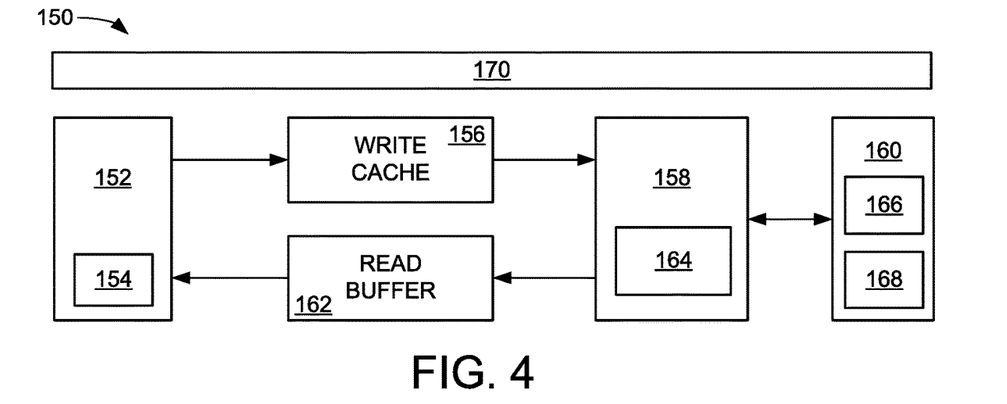
FIG. 4 depicts a block representation of portions of an example data storage system configured in accordance with various embodiments.

FIG. 4 depicts a block representation of portions of an example distributed data storage system 150 in which assorted embodiments can be practiced. One or more core controllers (CPU) 152 can communicate data commands and signals alone, or in conjunction with other controllers, such as a front end controller and a back end controller of a data storage device 104. For instance, a front end controller can perform host I/F functions while a back end controller directs data transfers with a memory module and the core controller 152 provides top level control for the device 104.

Each controller of a data storage device 104 can comprise separate programmable processors with associated programming (e.g., firmware, FW) in a suitable memory location, as well as various hardware elements to execute data management and transfer functions. However, such an example is merely illustrative of one embodiment and is in no way limiting. For example, other embodiments configure a single programmable processor to carry out each of the front end, core, and back end processes using associated firmware in a suitable memory location. A pure hardware based controller configuration can also be used. It is contemplated that a device controller 152 may be integrated into a single system on chip (SOC) integrated circuit device, or may be distributed among various discrete devices.

The core CPU 116 is shown in conjunction with a code management engine (CME) 154 that can be used to manage the generation of the respective code words and outer code parity values for both standard and non-standard parity data sets. During write operations, input write data from the associated host are received and processed to form map units which are placed into a non-volatile write cache 156 which may be flash memory or other form(s) of non-volatile memory. The map units can then be transferred to the DMM circuit 158 for writing to the flash memory 160 in the form of code words. During read operations, one or more pages of data are retrieved to a volatile read buffer 162 for processing prior to transfer to the host.

The CME 154 determines the appropriate inner and outer code rates for the data generated and stored to memory. In some embodiments, the DMM circuit 158 may generate both the inner and outer codes. In other embodiments, the DMM circuit 158 generates the inner codes, via an LDPC circuit and the core CPU 152 generates the outer code words. In still other embodiments, the same processor/controller circuit generates both forms of code words. Other arrangements can be used as well. The CME 154 establishes appropriate code rates for both types of code words. During generation of the outer codes, a parity buffer 164 may be used to successively XOR each payload being written during each pass through the dies of the flash memory 160. Both payload data 166 and map data 168 can be stored to the flash memory 160.

It is noted that various portions of data can be separated and stored in different locations of the data storage system 150 at any time only to be reunited for delivery to the predetermined data destination in satisfaction of a data access request. It is further noted that a data access module 170 can monitor, access, and manipulate any portion of the data storage system 150 to provide intelligent data access request completion uniformity. As a non-limiting example, the data access module 170 can insert time accelerations and/or delays for a data access request in the form of logical, or actual, movement of data between a host and the flash memory 160. That is, the data access module 170 can actually hold or move data in a memory, such as cache 156 or buffer 162, until a specified time or logically signal data has been held or present in a memory to ensure a data access request is completed in a specified time consistent with other accesses during a deterministic window.

Figure 5:
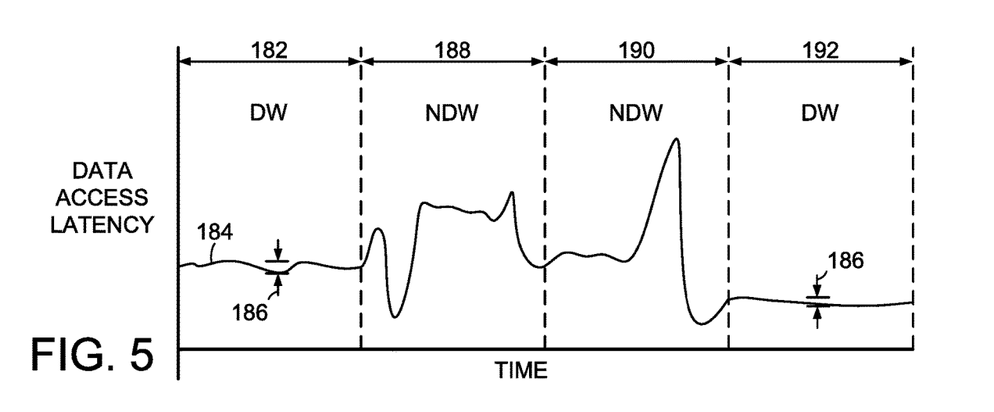
FIG. 5 plots example operational metrics for an example data storage system in accordance with assorted embodiments.

FIG. 5 plots example operational data for a data storage system configured and operated in accordance with various embodiments to improve data access request completion uniformity during deterministic windows. As shown, data access latency is charted over time involving deterministic window (DW) and non-deterministic window (NDW) intervals. During a first DW interval 182, data access latency, as indicated by solid line 184, of a plurality of accesses to different portions of a memory is maintained within a relatively tight range 186, which corresponds with data read/write consistency over time. It is contemplated that different data access performance metrics, such as error rate and overall time to return data to a host, can be used in substitution of, or in combination to, the access latency of FIG. 5 with similarly tight ranges 186, and approximately uniform consistency, of access performance being maintained.

The tight consistency of data access comp during the DW can be, at least partially, contributed to background data maintenance operations and/or data writes being reduced or suspended. A DW interval is followed by one or more NDW intervals, such as interval 188, where pending data writes and background data maintenance operations are carried out along with data reads. The inherent behavior of data writes that involve data erases prior to programming data and data maintenance operations that involve varying volumes of processing, data reads, and data writes contribute to the variance of read latency The second NDW 190 shows how data accesses and data maintenance operations are not consistent and can be considered random compared to the tight range 186 of data access performance the DW intervals 182 and 192. It is noted that the consistent performance for the first DW interval 182 is at a different latency value than the second DW interval 192. Hence, consistency is prioritized throughout a DW interval regardless of the latency value that is consistently provided to a host, even at the expense of providing less than the fastest possible read performance. In other words, predictable read latency, and performance, are emphasized during a DW interval even if that means providing higher read/write latency than possible.

Figure 6:
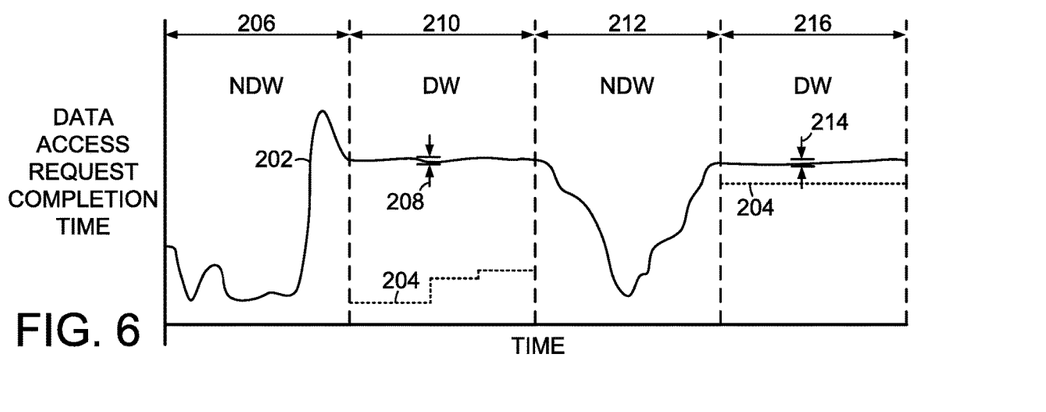
FIG. 6 plots example operational metrics for an example data storage system in accordance with some embodiments.

FIG. 6 plots operational information pertaining to an example data storage system utilized in accordance with assorted embodiments. The data access request completion times for a plurality of data access requests over time is illustrated for several different deterministic and non-deterministic windows. The solid line 202 corresponds with the actual data access request completion times while the segmented lines 204 correspond with the maximum data access request completion time at a given time and under the operating conditions of the data storage system.

As shown, a non-deterministic operational window 206 experiences a relatively wide range of data access request completion times. Such variation may be explained by the volume of data writes compared to data reads, the length of data being stored or retrieved, the location of data within a data storage system, and upstream controller/buffer/cache real-time resources. Regardless of the cause of request completion times in the non-deterministic period 206, execution of a data access uniformity strategy can provide a significantly tighter range 208 of completion times during a deterministic period 210. It is contemplated that a data access module can generate, alter, and execute a data access uniformity strategy in response to detected data storage activity during the preceding non-deterministic window 206, or some other data storage activity of the data storage system, to mitigate variability of access request completion times.

It is noted that the tighter range 208 of completion times during period 210 can average to be slower than the ideal access completion times capable from the data storage system. It is further noted that the ideal access completion times for a system changes over time, which is not required, but represents how the maximum possible data storage performance of a distributed data storage system can change in response to receiving, executing, and completing data access requests from one or more connected hosts. In some embodiments, a host can provide a target access completion rate that is matched during the deterministic window 210 as long as the requested rate is greater than the ideal/maximum possible request completion rate.

Although it is possible to continue the tighter range 208 of request completions after the deterministic period 210 ends, some embodiments of a data access uniformity strategy allow the range 208 to broaden during a subsequent non-deterministic window 212. The increased request completion time variability during window 212 can coincide with the execution of one or more background operations that were paused during the preceding deterministic window 210, such as garbage collection, data compression, data encryption, data mapping, and data reconstruction. The execution of such background operations may, in some embodiments, be prioritized by an access uniformity strategy during the non-deterministic window 212 to allow a tight completion range 214 to be guaranteed to a host during a deterministic window 216 sooner than if background operations were not prioritized during the non-deterministic window 212. That is, the access uniformity strategy can prescribe one or more actions to alter when a deterministic window can begin and how long that window can continue to provide access request completion times within a tight range 208/214 that averages over time to a prescribed deterministic completion rate guaranteed to the host.

Figure 7:
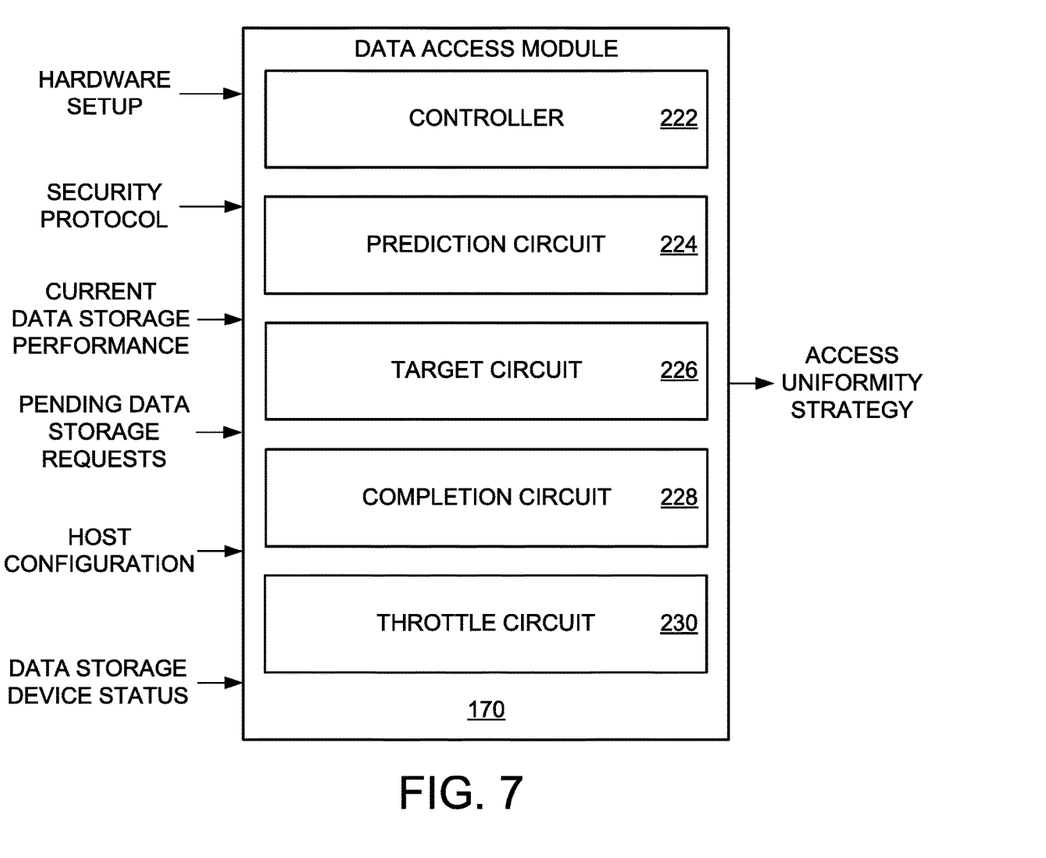
FIG. 7 depicts a functional block representation of an example data access module that can be utilized in a data storage system in various embodiments.

FIG. 7 depicts a block representation of the example data access module 170 of FIG. 4 that can be employed in a distributed data storage system in accordance with various embodiments. The module 170 can utilize one or more local controllers 222 that direct the input of various system information and the generation of at least one access uniformity strategy in view of the gathered information. It is noted that the module 170 may be a stand-alone component with independent hardware connected to a data storage device 104 or network component. Alternatively, the module 170 may be resident in any data storage device 104, network component, or host 102 with independent or cooperative hardware. That is, the controller 222 may be an independent programmable circuit or hardware shared with a data storage device 104, network component, or host 102.

The controller 222 can gather assorted types and volumes of information about a data storage system through detection of current conditions, polling various system components, or assuming activity/conditions based on other detected conditions. While not required or limiting, the module controller 222 can gather the hardware setup and configuration of the system, the security protocol employed for data and/or component initialization, current data storage performance for data reads and/or writes, status of a data access request queue, the number and type of connected hosts, and status of one or more connected data storage devices. The collection of gathered system information allows the controller 222 to generate an intelligent data access uniformity strategy based on actual system conditions and performance instead of from modelled or out-of-date system information.

The module controller 222 can utilize the collected system information with a prediction circuit 224 to forecast one or more condition, action, or performance for the system and/or data. The ability to accurately predict future events for a data storage system allows the controller 222 to orchestrate countermeasures and/or preventative measures that can prevent, or mitigate the effects of, the predicted event. The countermeasures and preventative measures can be used in the access uniformity strategy to optimize the strategy's efficiency and adaptability. For instance, the prediction circuit 224 can forecast too big of a range of access request completion times during a deterministic window as a result of a system action and the controller 222 can incorporate one or more corrective/preventative measures that can be executed to reduce the variability of the predicted data access request completion time and comply with the average completion time of the deterministic window.

The data access module 170 may poll, detect, or predict an access request completion rate that can be guaranteed for a future deterministic window with a target circuit 226. It is contemplated that the target circuit 226 can additionally determine when a deterministic window can start and how long a guaranteed request completion rate can be guaranteed. The target circuit 226 can generate one or more reactions to events in the access uniformity strategy to alter, end, or begin a deterministic window as well as the completion rate of requests during the window. As an example, the target circuit 226 can generate a shortening of a deterministic window in response to a range of completion times varying, an error rate of a data storage device reaches a threshold, or data read latency of one or more data storage devices changes or exceeds a threshold.

A completion circuit 228 can continuously, or sporadically, monitor data access request satisfaction rates during deterministic and non-deterministic periods to determine if a target completion rate average over time is being satisfied, can be maintained, or is unsustainable. That is, the completion circuit 228 can ascertain real-time current data storage performance and how predicted performance can alter the capability of a system to deliver a target access request completion time. Over time, the completion circuit 228 can update the access uniformity strategy in response to current and predicted system conditions, activity, and performance to provide realistic and sustainable access request completion times that average to a target rate throughout a deterministic period.

The evaluation and adaptation of the access uniformity strategy to optimize the delivery of access request completion times in a tight range during deterministic windows allows actions to be taken during non-deterministic windows to ensure an average access request completion time can be sustained for the guaranteed duration of the deterministic window. The respective circuits 224/226/228 of the data access module 170 can be active at any time before and during the execution of an access uniformity strategy to prescribe proactive and reactive actions to be taken to reduce the variability of data access request completion times. A throttle circuit 230 of the data access module can operate independently, and in concert with the other module circuits 224/226/228, to determine how exceedingly fast data access request completions can be handled to provide consistent completion times on average. That is, the throttle circuit 230 can concentrate on what to do with faster than target access completion times while the remaining circuits 224/226/228 concentrate on preventing slower than target access completion times.

Upon detection, or prediction, of a data access request being completed faster than needed to comply with a target completion average rate set by the data access module 170, or a rate set by an upstream network controller or host, the throttle circuit 230 can provide the access uniformity strategy with one or more actions to utilize the extra time between the target completion average rate and the actual completion rate. It is noted that the throttle circuit 230 can prescribe actions during non-deterministic windows as well as during deterministic windows. For instance, the throttle circuit 230 may prescribe an action of delaying data being delivered to a destination so that the request completion time is closer to the target average rate. Another non-limiting action can consist of delivering data to a host without delay while inserting a time delay for the signal notifying the host/system that the request has been completed.

In some embodiments, the throttle circuit 230 prescribes actions that are meant to smooth the transition between request completion rates instead of reaching a target completion rate as closely as possible, which can make the action more efficiently administered and carried out. The ability to smooth completion rate transitions can allow the access uniformity strategy, and the circuits 224/226/228, to react less drastically, and more realistically, to variability in completion times than if a drastic completion rate transition to a target average was executed.

A non-limiting example involves a 50 µs target completion rate and prediction of several request completion times of 40 µs before a slowdown of a 150 µs request completion time due to multiple voltage adjustments followed by 60 µs completion times, to which the throttling circuit 230 can prescribe one or more actions to utilize the extra 10 µs of the request completions to prevent, or at least reduce, the 150 µs request completion time, such as proactive voltage adjustment, data movement, or reorganization of a request queue. More generally, the throttling circuit 230 can induce a 10% slow down for some data access request completions so that a margin is established for completion rate compared to a target completion rate, which allows for actions to speed up or mitigate one or more request completions that are slower than the target rate.

Although not required, the throttle circuit 230 can operate on data read requests while the access uniformity strategy prescribes actions for both read and write requests. As such, the throttle circuit 230 can partition a read buffer into sections that facilitate the intentional delay of data before being delivered to a requesting host. It is contemplated that the throttle circuit 230 manipulates the rate at which data access requests are received, or acknowledged, in order to create margin between a target request completion rate and actual completion times, which allows for proactive actions to be undertaken to prevent/mitigate particularly slow request completions. For instance, the throttle circuit 230 can buffer/cache/store a request for a delay period prior to being processed and acknowledged by a network controller or a downstream data storage device controller. Hence, the data access module 170 can interject one or more actions and control the flow of data, requests, and completion signals to increase the uniformity of data access request completions, particularly in deterministic windows prepared for by the access uniformity strategy.

While assorted aspects of a throttle circuit 230 can seize the opportunity provided by request completions that are faster than a target completion rate, the throttle circuit 230 may additionally delay the issuance of request/command complete notifications to a network controller and/or host regardless whether data has been delivered to the host. Such intentional deception of when a request has been completed may correspond to a detected, or predicted, data access request completion that balances the delayed notification to provide the target request completion rate on average. This balancing of different request completion times via intentional delaying of data, requests, and/or completion notifications allows the data access module to provide very consistent request completion times, when viewed from the entirety of a deterministic or non-deterministic window, that maintain a close average with a target completion rate.

Figure 8:
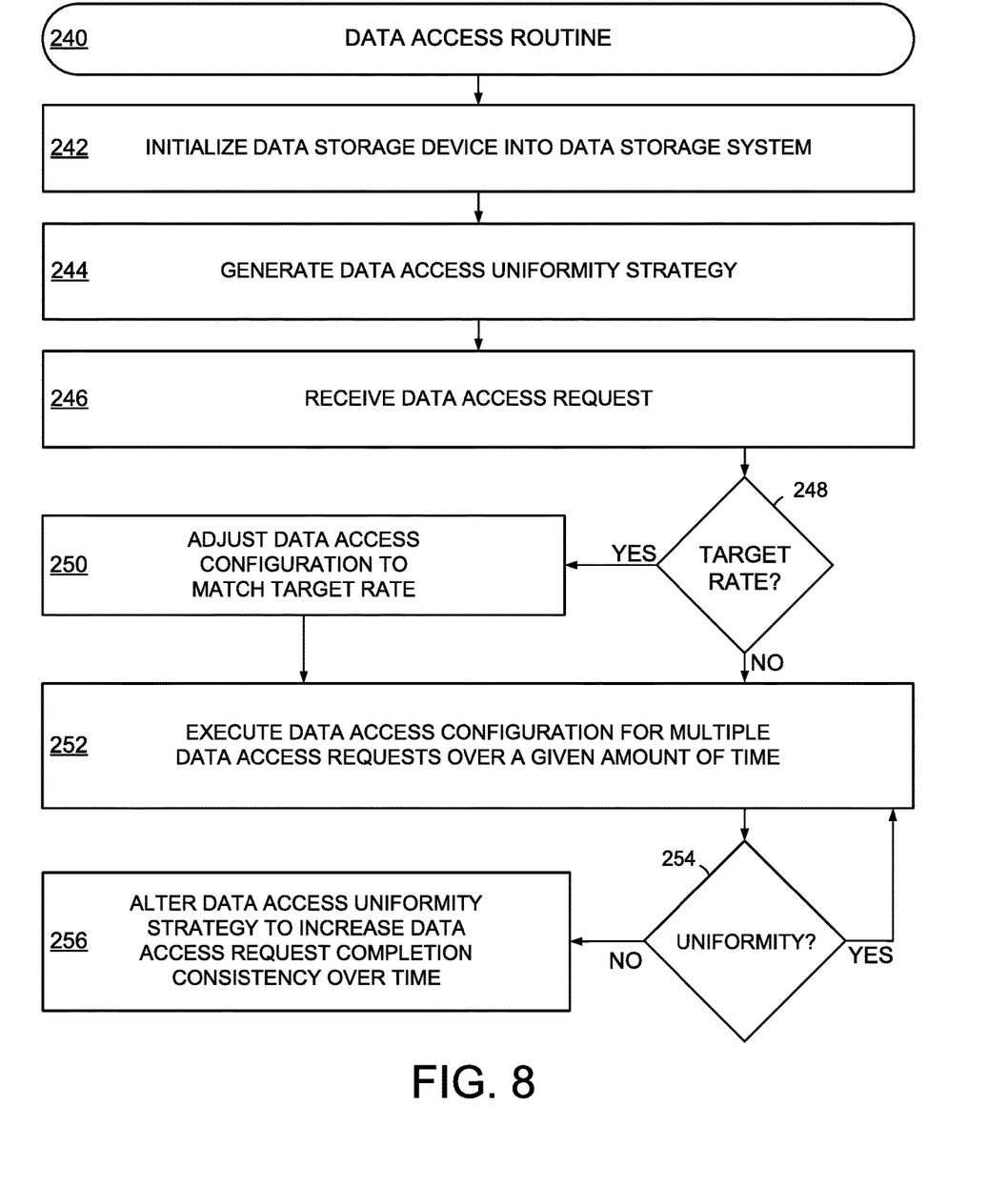
FIG. 8 is a flowchart of an example data access routine that can be carried out with the embodiments of FIGS. 1-6.

FIG. 8 is a flowchart of an example data access routine 240 that can be performed by a data access module 170 as part of a distributed data storage system in accordance with some embodiments. At least one data storage device is initialized into a data storage system in step 242. Such initialization may involve a power cycle, boot, security, or firmware reset where the data storage device(s) are prepared for access from at least an upstream network controller connected to at least one host. The data access module can then generate at least one data access uniformity strategy for the data storage system in step 244. The strategy generation of step 244 can involve the detection of data storage activity and performance from normal host requests, test patterns of requests generated by the data access module, or modelled data stored and accessed by the data access module.

The generated data access uniformity strategy may prescribe any number of proactive and/or reactive measures and actions that are triggered at predetermined times, such as after a deterministic window ends or when a request completion time is out of a predetermined range, or in response to encountered conditions, such as a host-defined target completion rate or data error rate. The data access uniformity strategy can be pending or actively executed when step 246 receives one or more data access requests from at least one host connected to a data storage device via a network controller and the data access module. It is noted that the data access uniformity strategy may prescribe the execution of one or more proactive measures/actions prior to receipt of the request in step 246, such as accelerating garbage collection operations, reorganizing existing queued data access requests, mapping data, or executing data reconstruction operations.

The data access request(s) received in step 246 are evaluated in decision 248 to determine if a target completion time/rate is in place. That is, decision 248 determines if the data access request is subject to a host or system induced target completion time/rate. For instance, no target completion rate may be present during a non-deterministic window while a target completion time, and average completion rate, may be in place during a deterministic window. However, decision 248 is not limited to identifying the presence of deterministic or non-deterministic windows and can evaluate if a target completion rate is appropriate for current and future data storage performance, such as if a deterministic window is scheduled and a target request completion time is needed to ensure the window starting on time.

If a target completion time/rate is in place for the request received in step 246, step 250 proceeds to adjust the data access configuration of the system to ensure the request matches the target time/rate as closely as possible. The adjustments of step 250 may be prescribed by the data access uniformity strategy or developed in real-time by the data access module and can involve one or more measures/actions undertaken to meet the target rate. It is noted that the alteration of the data access configuration may not prioritize the request received in step 246 and may, instead, delay the execution, data movement, and/or request completion notification if the target rate is slower than the detected, or predicted, completion time/rate for the received request.

In the event no target rate is present, or at the conclusion of the adjustment of at least one data access configuration for the target rate, step 252 proceeds to execute the current data access configuration prescribed by the access uniformity strategy and/or data access module for multiple data access requests over a given amount of time. The satisfaction of the assorted data access requests in step 252 may be monitored sporadically, if in a non-deterministic window, or continuously if in a deterministic window, to ensure compliance with any current or future deterministic windows or target completion rates. Such monitoring can involve simple detection of data storage performance and capabilities of one or more data storage devices and upstream network components, such as error rate, read latency, write latency, queue capacity, or storage capacity. The monitoring may also involve more complex computation of one or more performance metric for a data storage device, network component, or overall system, such as data request patterns, storage device access frequency, effects of changing encryption settings, effects of changing compression settings, and ideal request completion time for current data storage conditions.

The execution of data access requests in step 252 may occur for any amount of times and can be cyclical, without limitation. However, decision 254 may, at any time, determine if the uniformity of current, or predicted, data access request completion times is consistent enough to ensure an average completion rate can be guaranteed for a current, or future, deterministic window. If the uniformity is not sufficient, the access uniformity strategy is altered in step 256 to modify at least one data access configuration, proactive action, reactive action, execution time, or triggering condition to improve the consistency of current and/or future data access request completion times. It is contemplated that if the uniformity of request completion is too far off, or if step 256 is not successful in correcting a strategy, that routine 240 returns to step 244 where a new strategy is generated from scratch based on current and predicted system conditions and data storage performance.

While the steps and decisions of routine 240 provide optimized data access request completion uniformity, the various aspects are not required or limiting as any portion of the routine 240 can be changed or removed, just as any other step/decision can be added. Through the various embodiments of a distributed data storage system employing a data access module, data access commands can be managed intelligently to provide greater completion consistency over time that produces uniformity for selected time periods, such as deterministic windows. The ability to generate a data access uniformity strategy that can intelligently prescribe proactive and/or reactive actions to prevent, and at least mitigate, large variations in data access request completion times allows for a deterministic window to be guaranteed with greater accuracy than if static request execution configurations were utilized.

What is claimed is:

1. A method comprising:
transferring user-generated data from a data storage device to a host responsive to a host workload comprising data read requests from the host received at a requested rate;
satisfying a first data read request of the workload to the host at a first rate, the first rate being faster than the requested rate; and
delaying a completion rate of a second data read request of the workload after a data block corresponding with the second data read request has been delivered to the host by withholding a request complete signal to the host for the second data read request, the second data read request delayed so that completion of the first data read request and second data read request average to nominally match the requested rate.

2. The method of claim 1, wherein the completion rate of the second data read request is delayed by a data access module connected to the host and data storage device.

3. The method of claim 2, wherein the data access module generates a uniformity strategy that prescribes how the completion rate is delayed to nominally match the requested rate.

4. The method of claim 3, wherein the uniformity strategy prescribes an action to proactively increase an amount of time the completion rate is delayed.

5. The method of claim 4, wherein the action is prioritizing execution of a third data read request of the host workload over a fourth data read request of the host workload.

6. The method of claim 4, wherein the action is executing background operations on the data storage device prior to transferring the user-generated data.

7. The method of claim 6, wherein the background operations consist of garbage collection.

8. The method of claim 6, wherein the background operations consist of data mapping.

9. The method of claim 6, wherein the background operations consist of data reconstruction.

10. The method of claim 6, wherein the background operations consist of memory cell voltage calibrations.

11. The method of claim 4, wherein the action is pausing background operations on the data storage device prior to transferring the user-generated data.

12. The method of claim 4, wherein the action is conducted in response to an indication a deterministic window is imminent.

13. A method comprising:
servicing a first data read request to transfer a first user data from a non-volatile memory of a data storage device to a host by retrieving the first user data from the non-volatile memory;
transferring the retrieved first user data across an interface to an allocated buffer of the host at a first completion rate;
identifying the first completion rate is greater than a target rate provided by the host;
receiving a second data read request to transfer a second user data from the non-volatile memory to the host;
transferring the second user data from the non-volatile memory to the host at a second completion rate; and
initiating a delay after said transfer of the second user data, the delay withholding a request compete signal from the host and having a magnitude selected in response to a difference between the target rate provided by the host and an average of the first and second completion rates.

14. The method of claim 13, wherein the second user data is delivered to the host and the delay magnitude is chosen to satisfy the target rate associated with a deterministic window.

15. The method of claim 13, wherein the delay is selected by a data access module to smooth a transition between other data access request completion times.

16. The method of claim 13, wherein a data access module connected to the host and data storage device executes a proactive action during the delay to increase future data access request completion time uniformity.

17. The method of claim 16, wherein the proactive action is executing a data write request.

18. The method of claim 16, wherein the proactive action is executing a background operation on the data storage device.

19. The method of claim 16, wherein a data access module connected to the host and data storage device executes a reactive action during the delay to increase future data access request completion time uniformity, the reactive action responsive to a predicted data access request completion time.

20. The method of claim 19, wherein the reactive action is reorganizing a data access request queue for the data storage device.

* * * * *